United States Patent
Subramanian et al.

(10) Patent No.: US 7,836,324 B2
(45) Date of Patent: Nov. 16, 2010

(54) OVERSAMPLING-BASED SCHEME FOR SYNCHRONOUS INTERFACE COMMUNICATION

(75) Inventors: Sridhar P. Subramanian, Cupertino, CA (US); Sukalpa Biswas, Fremont, CA (US); Vincent R. von Kaenel, Palo Alto, CA (US); Priya Ananthanarayanan, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 873 days.

(21) Appl. No.: 11/740,452

(22) Filed: Apr. 26, 2007

(65) Prior Publication Data

US 2008/0195884 A1 Aug. 14, 2008

Related U.S. Application Data

(60) Provisional application No. 60/889,141, filed on Feb. 9, 2007.

(51) Int. Cl.
*G06F 1/00* (2006.01)
*G06F 13/42* (2006.01)
*G06F 3/00* (2006.01)

(52) U.S. Cl. .......................... 713/500; 713/400; 710/61
(58) Field of Classification Search ................. 713/400, 713/500; 710/61
See application file for complete search history.

(56) References Cited

U.S. PATENT DOCUMENTS

| | | | |
|---|---|---|---|
| 4,864,496 A | 9/1989 | Triolo et al. | |
| 5,434,996 A | 7/1995 | Bell | |
| 5,754,614 A | 5/1998 | Wingen | |
| 5,951,635 A | 9/1999 | Kamgar | |
| 6,075,833 A | 6/2000 | Leshay et al. | |
| 6,128,749 A * | 10/2000 | McDonnell et al. | 713/600 |
| 6,675,272 B2 * | 1/2004 | Ware et al. | 711/167 |
| 6,680,874 B1 | 1/2004 | Harrison | |
| 6,724,683 B2 | 4/2004 | Liao | |
| 6,725,388 B1 | 4/2004 | Susnow | |
| 6,795,514 B2 * | 9/2004 | Gresham | 375/354 |

(Continued)

OTHER PUBLICATIONS

Mark Hayter, "Zen and the Art of SOC Design," Microprocessor Summit 2006, Session MPS-960 High End Processors, PA Semi, Apr. 3, 2006, 14 pages.

(Continued)

*Primary Examiner*—Ji H Bae
(74) *Attorney, Agent, or Firm*—Lawrence J. Merkel; Meyertons, Hood, Kivlin, Kowert & Goetzel, P.C.

(57) ABSTRACT

In one embodiment, an apparatus to synchronously communicate on an interface that has an associated interface clock for a circuit that has an internal clock used internal to the circuit comprises a control circuit coupled to receive the internal clock and the interface clock. The control circuit is configured to sample the interface clock multiple times per clock cycle of the internal clock and to detect a phase difference, to a granularity of the samples, between the internal clock and the interface clock. The apparatus comprises a data path that is configured to transport data between an internal clock domain and an interface clock domain. The data path is configured to provide at least two different timings on the transported data relative to the internal clock. The control circuit is coupled to the data path and is configured to select one of the timings responsive to a detected phase difference.

18 Claims, 8 Drawing Sheets

U.S. PATENT DOCUMENTS

| | | | |
|---|---|---|---|
| 6,949,958 B2 * | 9/2005 | Zerbe et al. | 327/3 |
| 6,956,776 B1 | 10/2005 | Lowe et al. | |
| 7,035,983 B1 | 4/2006 | Fensore | |
| 7,107,393 B1 | 9/2006 | Sabih | |
| 7,116,601 B2 | 10/2006 | Fung | |
| 2004/0080671 A1 * | 4/2004 | Siemens et al. | 348/473 |
| 2006/0277329 A1 | 12/2006 | Paulson et al. | |

OTHER PUBLICATIONS

James B. Keller, "The PWRficient Processor Family," PA Semi, Oct. 2005, 31 pages.

Cummings, et al., "Simulation and Syntheses Techniques for Asynchronous FIFO Design with Asynchronous Pointer Comparisons," Sunburst Design, Inc., 2002, pp. 1-18.

* cited by examiner

| BClk Rising Edge | S1 | S2 | E2 & E4 | E3 & E5 |
|---|---|---|---|---|
| PhA 0 | C3 | C5 | PhB | PhA + 180 |
| PhA 45 | C3 | C5 | PhB | PhA + 180 |
| PhA 90 | C2 | C4 | PhB | PhA + 180 |
| PhA 135 | C2 | Byp | PhB | PhA + 180 |
| PhA 180 | C2 | Byp | PhB | PhA + 180 |
| PhA 225 | C2 | Byp | PhA | PhB + 180 |
| PhA 270 | C3 | Byp | PhA | PhB + 180 |
| PhA 315 | C3 | C5 | PhA | PhB + 180 |
| PhB 0 | C3 | C5 | PhA | PhB + 180 |
| PhB 45 | C2 | C4 | PhA | PhB + 180 |
| PhB 90 | C2 | C4 | PhA | PhB + 180 |
| PhB 135 | C2 | C4 | PhA | PhB + 180 |
| PhB 180 | C2 | C4 | PhA | PhB + 180 |
| PhB 225 | C2 | C4 | PhB | PhA + 180 |
| PhB 270 | C3 | C5 | PhB | PhA + 180 |
| PhB 315 | C3 | C5 | PhB | PhA + 180 |

E1 = PhA
E6 = PhA

OVERSAMPLING-BASED SCHEME FOR SYNCHRONOUS INTERFACE COMMUNICATION

This application claims benefit of priority to U.S. Provisional Patent Application Ser. No. 60/889,141, filed on Feb. 9, 2007.

BACKGROUND

1. Field of the Invention

This invention is related to the field of integrated circuits and, more particularly, to synchronous communications among digital circuitry.

2. Description of the Related Art

As integrated circuit fabrication technologies continue to advance, the amount of circuitry that can be integrated onto one chip continues to increase and the operating frequencies for the clocks on the integrated circuits also continue to increase. Various circuitry within the integrated circuit may operate within different clock domains, in some cases. Even if the integrated circuit has a single clock domain, other integrated circuits may have different clock domains and thus communications between integrated circuits may cross clock domains.

High speed, low latency communication often requires that the communication be completed synchronously. If the communication is not synchronous, latency is generally introduced to transfer the data between clock domains (e.g. using first-in, first-out buffers, or FIFOs).

In some cases, within a given integrated circuit, clock tree delays in various physical locations can be matched so that synchronous communication can be accomplished. However, especially in cases in which wide operating voltage ranges are supported and in which different portions of the integrated circuit can operate at different supply voltages, matching the clock trees across all combinations of operating voltages, frequencies, and fabrication process variations is prohibitively difficult.

SUMMARY

In one embodiment, an apparatus to synchronously communicate on an interface that has an associated interface clock is contemplated. The apparatus is for a circuit that has an internal clock used internal to the circuit, and the apparatus comprises a first latch coupled to receive data and a second latch coupled in parallel with the first latch to receive the data. The apparatus further includes a first clock gater coupled to receive the internal clock and a first clock enable, wherein the first clock gater is coupled to the first latch to provide a clock control to the first latch. The apparatus comprises a second clock gater coupled to receive an inversion of the internal clock and a second clock enable, wherein the second clock gater is coupled to the second latch to provide a clock control to the second latch. Coupled to receive the internal clock and the interface clock, the control circuit is configured to capture a plurality of samples of the interface clock for each clock cycle of the internal clock. The control circuit is configured to generate the first clock enable and the second clock enable responsive to the plurality of samples.

In an embodiment, the apparatus comprises a control circuit coupled to receive the internal clock and the interface clock, wherein the control circuit is configured to sample the interface clock a plurality of times per clock cycle of the internal clock. The control circuit is configured to detect a phase difference, to a granularity of the samples, between the internal clock and the interface clock responsive to the samples. The apparatus further comprises a data path that is configured to transport data between an internal clock domain and an interface clock domain. The data path is configured to provide at least two different timings on the transported data relative to the internal clock. The control circuit is coupled to the data path and is configured to select one of the timings responsive to a detected phase difference.

In one embodiment, a method is contemplated to synchronously communicate on an interface that has an associated interface clock for a circuit that has an internal clock used internal to the circuit. The method comprises sampling the interface clock a plurality of times per clock cycle of the internal clock; selecting one of a plurality of timings through a data path that transports data between an internal clock domain and an interface clock domain, the plurality of timings relative to the internal clock, responsive to the samples; and transporting the data with the selected timing to a receiving clock domain of the internal clock domain or the interface clock domain.

BRIEF DESCRIPTION OF THE DRAWINGS

The following detailed description makes reference to the accompanying drawings, which are now briefly described.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

The description below uses an example embodiment of a system on a chip with intrachip communication accomplished on a bus. However, in general, any type of synchronous interface may be used (e.g. packet based, command based, etc.). The synchronous interface may have a corresponding interface clock to which signals on the interface are referenced. That is, timing of the signals is measured with referenced to the interface clock. Furthermore, while an intrachip interface is described, similar circuitry may be used to provide synchronous communication on an interface external to a given integrated circuit (e.g. an interchip interface).

Figure 1:
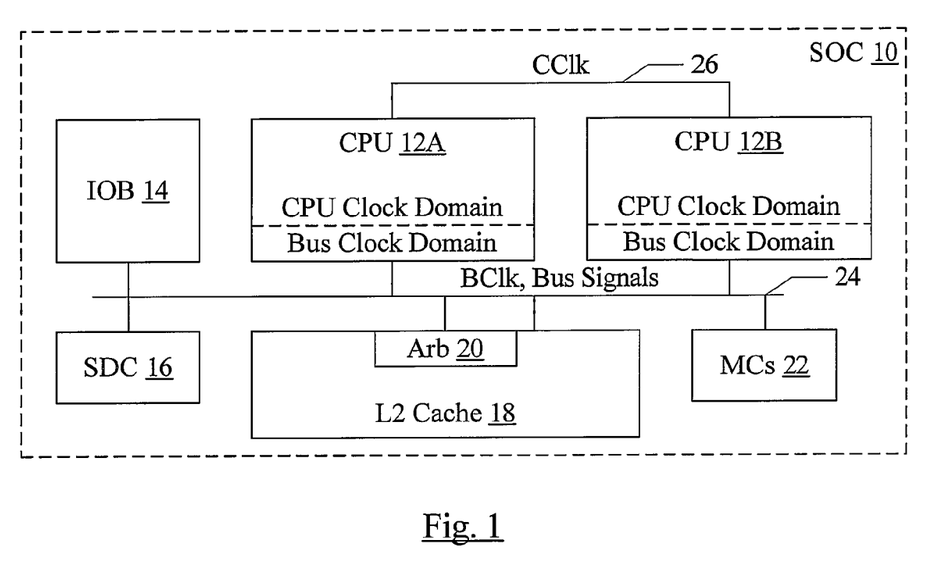
FIG. 1 is a block diagram of one embodiment of a system on a chip.

Turning now to FIG. 1, a block diagram of one embodiment of a system on a chip (SOC) 10 is shown. The SOC 10 may comprise a single integrated circuit, in one embodiment. The SOC 10 in FIG. 1 includes one or more central processing units (CPUs) 12A-12B, an input/output (I/O) bridge (IOB) 14, a system debug controller (SDC) 16, and L2 cache 18, an arbiter 20, and one or more memory controllers (MCs) 22. The CPUs 12A-12B, the IOB 14, the SDC 16, the L2 cache 18, the arbiter 20, and the memory controllers 22 are all connected to a bus 24 to communicate. Specifically, the bus 24 may be a synchronous, high speed bus referenced to a bus clock (BClk).

Many of the components shown in FIG. 1 may operate internally according to the BClk as well, or may operate according to a different clock but may have their clock tree delays matched to provide synchronous operation of the internal clock to the BClk over fabrication process and operating condition variations (e.g. temperature variations). For example, the IOB 14, the SDC 16, the L2 cache 18, the arbiter 20, and the memory controllers 22 may have their clock tree delays matched and may be synchronized to the BClk due to the matching.

On the other hand, some components may operate according to an internal clock that is different from the BClk, and may not have their clock tree delays matched to the BClk. For example, the CPUs 12A-12B operate according to a CPU Clock (CClk) 26. In one embodiment, the CPUs 12A-12B are each divided into a CPU clock domain and a bus clock domain, delimited by a horizontal dashed line in FIG. 1. Generally, a clock domain may refer to the circuitry that is controlled according to a given clock. That is, the clocked devices in the circuitry (e.g. registers, flops, latches, memory arrays, etc.) are clocked by the given clock or a clock derived from the given clock. Most of the CPUs 12A-12B may be in the CPU clock domain, controlled by the CClk 26. The bus interface circuitry and related buffering may be in the bus clock domain.

The CPUs 12A-12B may be subject to supply voltage variation during operation (e.g. to save power). Accordingly, the CPUs 12A-12B may have a wide operating voltage range, which affects circuit operation in the CPUs 12A-12B, including clock tree circuits. Additionally, in one embodiment, the CPUs 12A-12B may cover a significant amount of semiconductor substrate area, and thus a fairly elaborate clock tree may be implemented to distribute the CClk throughout the domain. The combination of these features makes matching the clock tree delay problematic. In one embodiment, the CClk operates at a frequency that is a multiple of the frequency of the BClk. Specifically, a fixed ratio of 2:1 will be used in the present description, although other multiples are contemplated in other embodiments. Furthermore, the multiple may be programmable in other embodiments.

Rather than attempt to match clock tree delays, the CPUs 12A-12B include a synchronization circuit that permits synchronous, low latency data transfers from the CPU clock domain to the bus clock domain, and vice-versa. The synchronization circuit may sample the BClk multiple times per clock cycle of the CClk, and may use the samples to determine the timing of the transfer of data between domains. Specifically, the synchronization circuit may determine the timings of data transmission relative to the CClk, to provide the best setup and hold times to the receiving storage device(s) in the receiving clock domain. Viewed in another way, the synchronization circuit may include a data path from the transmitting clock domain to the receiving clock domain. The data path may support two or more timings, referenced to the CClk, for the transfer. The synchronization circuit may select the timing that provides the best setup and hold time based on the phase difference between the CClk and BClk, as indicated by the samples. The selected timing may vary dynamically during operation, as the phase may change during operation.

The synchronization circuit may effectively determine the phase difference between the BClk and the CClk, at least to a granularity of the samples. That is, the phase difference may be determined with a margin of error of approximately the difference in CClk phase between the samples. In one embodiment, the samples may be nominally equally spaced throughout the clock cycle of the CClk (measured in degrees of phase of the clock cycle). In practice, fabrication process variation and operating conditions may cause the actual spacing to vary from the nominal spacing. That is, the nominal spacing may be the designed spacing, and variations from nominal may be experienced in practice. Based on the detected phase difference, the synchronization circuit may select the timing of the data transfer between the clock domains, to provide a synchronous transfer.

In one embodiment, at least two timings are supported in the data path (one based on the CClk and the other based on the inversion of the CClk, approximately 180 degrees of CClk out of phase), and the synchronization circuit may dynamically select among the timings based on the detected phase difference. The selected timing may provide the best setup and hold time characteristics, among the possible timings, to the receiving storage device(s) in the receiving clock domain for the detected phase difference. In one embodiment, a third timing may be provided (bypass of the data). And the selected timing may be between the three possible timings.

Additionally, in one embodiment in which the CClk operates at a multiple of the BClk, the synchronization circuit may determine whether a given clock cycle of the CClk is primarily in the high portion of the BClk or the low portion of the BClk. The determination is "primarily" in one portion or the other since the clock may generally overlap the transition from high to low or low to high. Dependent on the phase difference between the BClk and the CClk (measured from rising edges of each), the selected timing may be based on the CClk or the inverted CClk in either phase A or phase B, providing up to four possible timings (or 5, with the bypass path). The high portion of BClk may be referred to as phase A herein, and the low portion may be referred to as phase B.

The CPUs 12A-12B may generally comprise circuitry configured to execute instructions defined in an instruction set architecture. In one embodiment, the CPUs 12A-12B may implement the Power™ architecture (formerly the PowerPC™ architecture). Other embodiments may implement other instruction set architectures (e.g. x86-based instruction set architectures, MIPS, SPARC, etc.).

The L2 cache 18 may comprise a high speed cache memory storing data from the memory to which the memory controllers are coupled, during use. The L2 cache 18 may provide and/or receive data for memory operations performed on the bus 24. The memory controllers 22 may couple to external memory. The external memory may comprise random access memory (RAM) such as dynamic RAM (DRAM), synchronous DRAM (SDRAM) double data rate SDRAM (DDR SDRAM, include DDR II), Rambus DRAM (RDRAM), etc.

The IOB 14 may bridge between the bus 24 and various I/O peripherals (on the SOC 10, external to the SOC 10, or both). The SDC 16 may be provided to implement various debug functions that may be used to diagnose problems in operation of the SOC 10 and to provide other system functions such as interrupt control, reset control, etc.

The arbiter 20 may comprise circuitry to arbitrate control of the bus 24 among various possible bus users (e.g. the CPUs 12A-12B, the IOB 14, the SDC 16, the L2 cache 18, and the memory controllers 22). The arbiter 20 may include an address arbiter that arbitrates for the address portion of the bus 24, and a data arbiter arbitrating for the data portion, in one embodiment.

It is noted that, while the CPUs 12A-12B use the synchronization circuit in the above described embodiment, other embodiments may use the synchronization circuit for other components, as desired. In some embodiments, delay matching may be eliminated in favor of using the synchronization circuit for each component.

Figure 2:
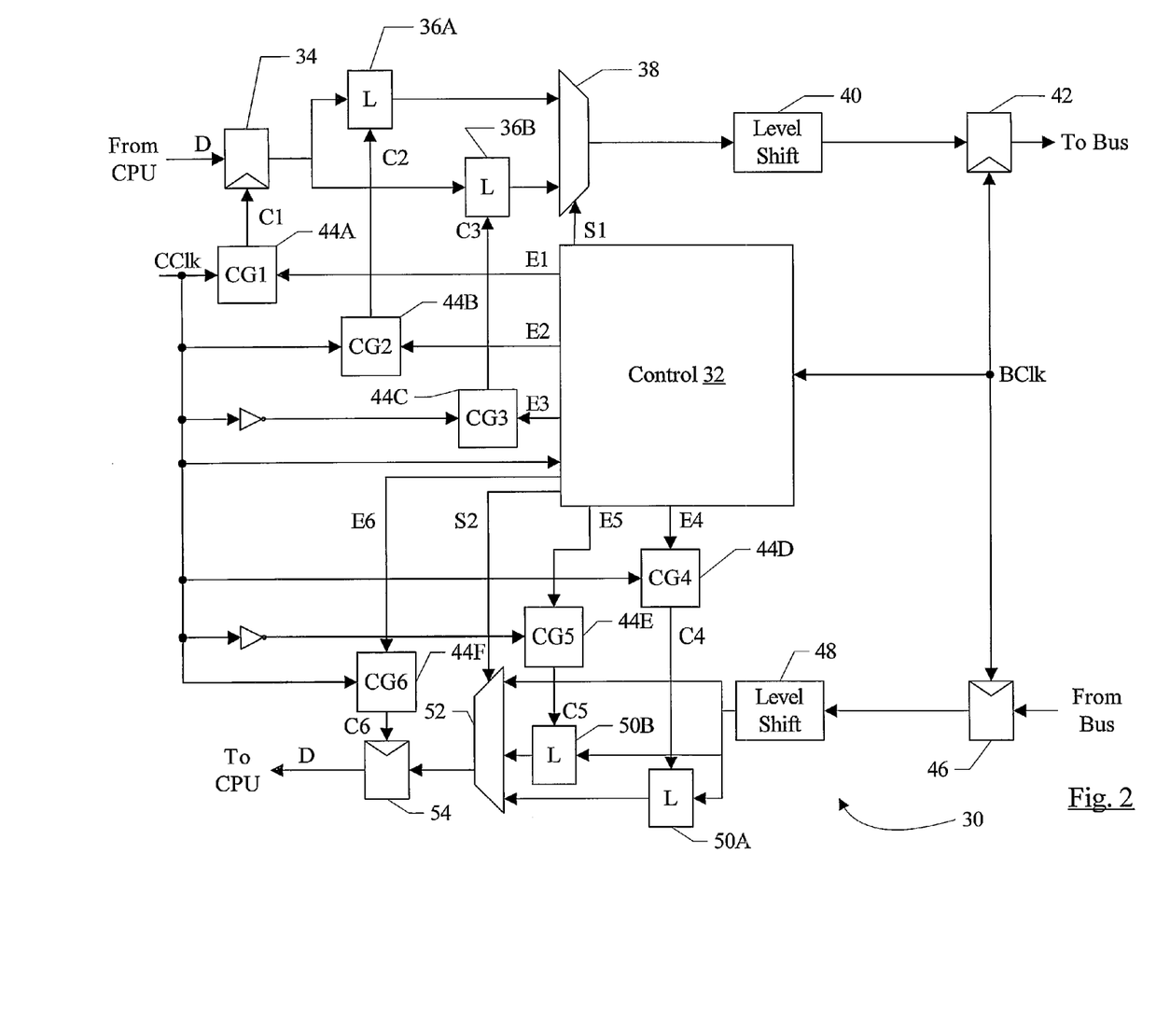
FIG. 2 is a block diagram of one embodiment of circuitry to synchronously communicate between a CPU clock domain and a bus clock domain.

Turning next to FIG. 2, a block diagram of one embodiment of a synchronization circuit 30 is shown. In the illustrated embodiment, the synchronization circuit 30 includes an outgoing data path from the CClk clock domain to the BClk domain, an incoming data path from the BClk domain to the CClk domain, and a control circuit 32 that controls the data paths. The control circuit 32 is coupled to the incoming data path and the outgoing data path. The control circuit 32 is further coupled to receive the CClk and the BClk.

The outgoing data path includes a flop 34, a pair of latches 36A-36B, a mux 38, a level shifter 40, a flop 42, and clock gater circuits (or more briefly, clock gaters) 44A-44C. The flop 34 is coupled to receive data to be transmitted on the bus from the CPU, and its output is coupled to the inputs of the latches 36A-36B. That is, the latches 36A-36B are coupled in parallel to receive the data from the flop 34. The outputs of the latches 36A-36B are coupled to the mux 38, which has its output coupled to the level shifter 40. The output of the level shifter 40 is coupled to the input of the flop 42, which has its output coupled to bus logic. The flop 34 and the latches 36A-36B each receive respective clocks C1, C2, and C3 from clock gaters 44A-44C. The flop 42 is coupled to receive the BClk clock. The control circuit 32 is coupled to provide clock enables E1 to E3 to the clock gaters 44A-44C, respectively. The clock gaters 44A-44B are coupled to receive the CClk, and the clock gater 44C is coupled to receive an inversion of the CClk. The control circuit 32 is coupled to provide a selection control S1 to the mux 38.

The incoming data path includes a flop 46, a level shifter 48, a pair of latches 50A-50B, a mux 52, and a flop 54. The flop 46 is coupled to receive data to be transmitted from the bus to the CPU, and its output is coupled to the level shifter 48. The output of the level shifter 48 is coupled to the inputs of the latches 50A-50B, and also as an input to the mux 52. That is, the latches 50A-50B are coupled in parallel to receive the data from the flop 46 (through the level shifter 48, in this embodiment). The outputs of the latches 50A-50B are coupled to the mux 52, which has its output coupled to the input of the flop 54, which outputs data to the CPU. The latches 50A-50B and the flop 54 each receive respective clocks C4, C5, and C6 from clock gaters 44D-44F. The flop 46 is coupled to receive the BClk clock. The control circuit 32 is coupled to provide clock enables E4-E6 to the clock gaters 44D-44F, respectively. The clock gaters 44D and 44F are coupled to receive the CClk, and the clock gater 44E is coupled to receive an inversion of the CClk. The control circuit 32 is coupled to provide a selection control S2 to the mux 52.

The outgoing data path will be described first. Generally, the outgoing data path supports at least two timings, relative to the CClk, for driving data to the bus clock domain. The flop 42 may receive the data into the BClk domain, and bus interface circuitry may be provided to handle the interface to the bus to transmit the data. Generally, the data may be any information that can be transmitted on the bus, and may include address, corresponding data, command, etc. The control circuit 32 may sample the BClk, as mentioned above, and may select the timing on the outgoing data path based on the samples. Specifically, the timing that provides the best setup and hold characteristics to the flop 42 (triggered by the BClk), based on the phase difference between the CClk and the BClk as indicated by the samples, may be selected. The selection is dynamic, and may vary as the phase difference between the CClk and the BClk varies.

The selection in the illustrated embodiment may be controlled by the control circuit 32 using the mux select control. In the outgoing data path, the mux 38 may select the output of the latch 36A or the latch 36B. The latch 36A is controlled according to the CClk, and the latch 36B is controlled according to the inversion of CClk (approximately 180 degrees out of phase with CClk). The latch 36A provides a timing that is based on the high portion of CClk and the latch 36B provides a timing that is based on the low portion of CClk, in the illustrated embodiment.

A flop may be an edge-triggered storage device that captures its input data for storage responsive to an edge of the input clock to the flop. For example, the flops in FIG. 2 may be positive edge triggered (triggered on the rising edge of the input clock). On the other hand, a latch may be a level triggered storage device. That is, the latch may be "open" (permitting its input to flow to its output) for one level of the input clock (e.g. high). The latch may be "closed" (isolating the output from the input and maintaining the stored value captured during the time that the latch is open) during the other level (e.g. low). Accordingly, the output of the flop 34 may flow through the latches 36A-36B to the mux 38 when the latches are open, and the latches may hold the value for about a half clock of the CClk before opening again.

Since the latch 36B is controlled according to an inversion of the clock controlling the latch 36A, the latches are open and closed during different times. Thus, the time that the captured data is held in each latch 36A-36B also differs. Two different timings for the data may be provided by selecting different latch outputs through the mux 38.

Additionally, in this embodiment, the CClk operates at a multiple of the clock frequency of the BClk (specifically, twice the clock frequency, as mentioned above). Accordingly, the timings may be varied not only by selecting between the latches 36A-36B, but also by controlling the clock gaters to gate the clock inputs to the latches 36A-36B and the flop 34 during one of the two CClks that correspond to a BClk. Which of the two clocks to gate may again be dependent on the phase difference between the CClk and the BClk, and a different ones of the two clocks may be gated in different clock gaters for a given phase difference. The control circuit 32 may generate the enables E1-E3 according to the phase difference indicated by the captured samples.

In the case of the CClk operating at a multiple of the BClk frequency, the phase difference between the clocks may be measured from an edge of the BClk to a nearest edge of the CClk. For example, in the present embodiment, the phase difference between the BClk and the CClk may be measured from the rising edge of the BClk to the nearest rising edge of the CClk. Since the phase difference can change over time, the control circuit 32 may be configured to detect a CClk that is nearest the rising edge and define that CClk to be phase A of the BClk, and the following CClk may be phase B of the BClk. Over time, the rising edge of BClk may be nearer the rising edge of the phase B CClk. The control circuit 32 may be configured to reassign phase A and phase B if the phase relationship changes. The phase change may be accomplished in an orderly fashion to ensure that communication on the bus is not corrupted. For example, in one embodiment, the bus may be "quieted" for a period of clock cycles to permit the phase change to occur.

The incoming data path may operate similarly, using the latches 50A-50B to vary the timing. In this case, the transfer is from the BClk clock domain to the CClk clock domain. The latches 50A-50B may be used to provide set up and hold time to the flop 54. Additionally, in some cases, the data from the flop 46 may be bypassed to the flop 54 (e.g. if the phase difference allows for the flop 46 to provide the best set up and hold time characteristics).

Accordingly, the outgoing and incoming data paths may ensure that setup and hold times of the receiving flops in the receiving clock domain are met, and thus the data is synchronously transferred between the clock domains. The synchronous transfer may be relatively low latency, and may track phase drift between the clock domains over time to ensure that the synchronous transfers continue to be made.

The level shifters 40 and 48 are provided in the illustrated embodiment to level shift the voltage of the signals between the bus voltage and the CPU voltage. The level shifters are provided in this embodiment because the CPU may operate at a different supply voltage than the bus. Other embodiments that use the same supply voltage for the CPU and the bus may not employ the level shifters 40 and 48.

It is noted that the present description refers to various circuitry being coupled to receive a clock. Generally, clocks may have many sinks and thus the signal actually received by a given circuit may be buffered from the clock signal, and thus may be somewhat delayed in time, although logically equivalent to the clock. Similarly, the inversion of the clock may be buffered as well.

Figure 3:
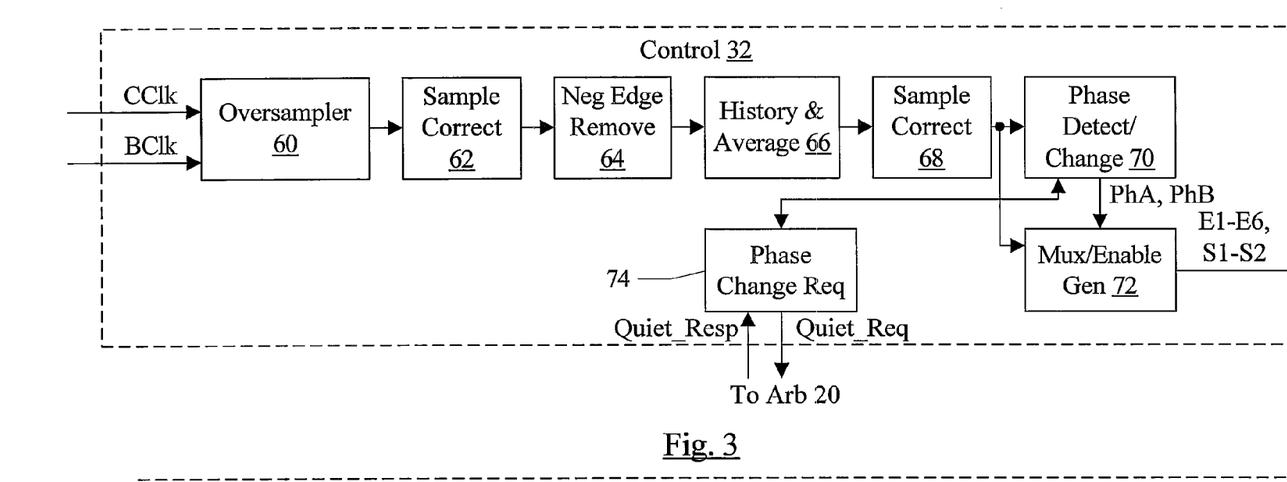
FIG. 3 is a block diagram of one embodiment of a control unit shown in FIG. 2.

FIG. 3 is a block diagram of one embodiment of the control circuit 32. In the illustrated embodiment, the control circuit 32 comprises an oversampler 60, a sample correct circuit 62, a negative edge removal circuit 64, a history and average circuit 66, a second sample correct circuit 68, a phase detect/change circuit 70, a mux/enable generator 72, and a phase change request circuit 74. The oversampler 60 is coupled to receive the BClk and the CClk, and is coupled to the sample correct circuit 62, which is further coupled to the negative edge removal circuit 64. The negative edge removal circuit 64 is coupled to the history and average circuit 66, which is coupled to second sample correct circuit 68, which is further coupled to the phase detect/change circuit 70 and the mux/enable generator 72. The phase change request circuit 74 is coupled to the phase detect/change circuit 70. The phase change request circuit 74 may supply a quiet request signal (Quiet_Req) to the arbiter 20 and receive a quiet response signal (Quiet_Resp). The mux/enable generator 72 is coupled to receive phase A and phase B (PhA, PhB) signals from the phase detect/change circuit 70 and is configured to generate the clock enables E1-E6 and the mux selection controls S1-S2.

The oversampler 60 is configured to capture a plurality of samples of the BClk per clock cycle of the CClk. The captured samples for a given clock cycle are passed as a unit (e.g. a bit vector) through the circuits 62, 64, 66, and 68 to the phase detect/change circuit 70 and the mux/enable generator 72. Any number of samples may be captured by the oversampler 60. For example, in one embodiment, the oversampler may capture 8 samples that are nominally evenly spaced throughout the CClk clock cycle. Thus, the samples may be measured in terms of nominal degrees of phase shift from the beginning of the CClk clock cycle (the rising edge of CClk).

Figure 4:
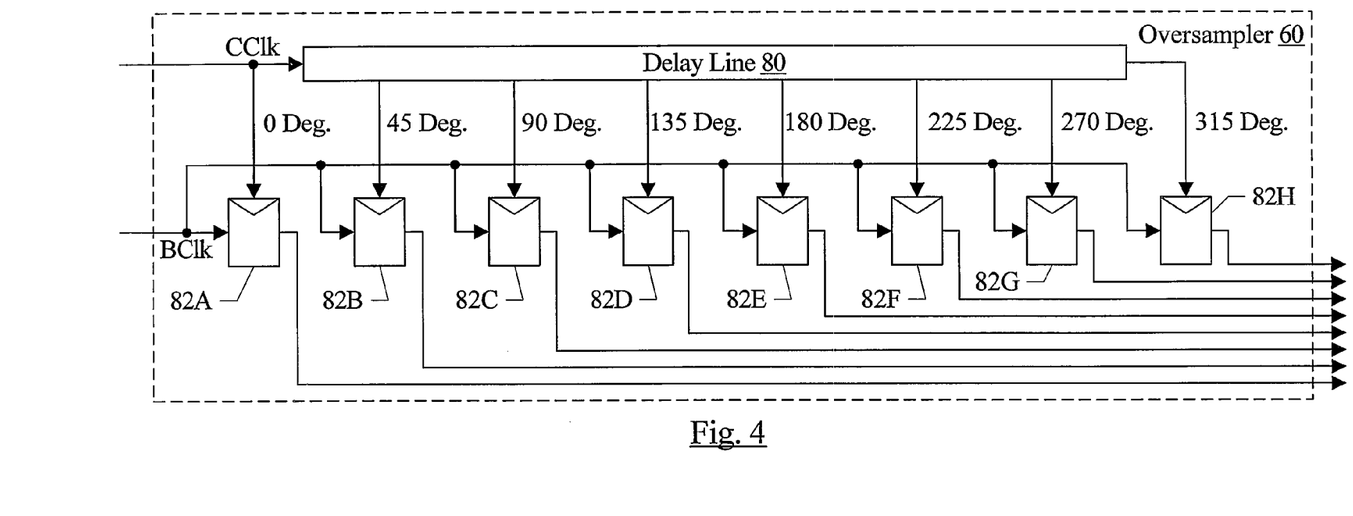
FIG. 4 is a block diagram of one embodiment of an oversampler circuit shown in FIG. 3.

For example, in FIG. 4, one embodiment of the oversampler 60 is shown. The oversampler 60 includes a digital delay line 80 and flops 82A-82F. Each flop 82A-82F is coupled to receive the BClk and a clock from the digital delay line 80. The digital delay line 80 is coupled to receive the CClk, and is configured to output delayed clocks to the flops 82A-82H that are nominally evenly spaced throughout the CClk cycle, at least at a designed frequency or frequency range. Thus, the clocks to the flops 82A-82H are at 0, 45, 90, 135, 180, 225, 270, and 315 degrees of the CClk (where the clock period has 360 degrees of phase). In one embodiment, the clocks may have a range of +/−15 degrees of the targeted phase. The outputs of the flops 82A-82H may form a bit vector of samples of the BClk for the present CClk clock cycle. Any number of samples may be captured in other embodiments.

Returning to FIG. 3, the samples may be processed by the sample correct circuit 62. The sample correct circuit 62 may filter for metastability in the samples. That is, since the CClk edges (phase delayed by the oversampler 60) may sometimes occur close in time to an edge of the BClk, the flops that capture a sample at approximately the same time as the BClk edge may not achieve a stable sample on the sample edge of the clock and may settle to an unpredictable value. The value will be 0 or 1, but may not correlate with nearby samples.

The negative edge removal circuit 64 may detect the falling edge of the BClk in the sample, and may remove that edge from the samples. The positive (rising) edge of the BClk may be the edge of interest for phase detection. In other embodiments, the negative edge removal circuit may be eliminated. The history and average circuit 66 may receive the samples, and may maintain a history of the last N CClk cycles worth of samples, and may average the current sample and previous samples to provide an average location of the rising edge of BClk, to the granularity of the samples. The history and averaging may mitigate the effects of noise and jitter on the detected phase difference between the BClk and the CClk. The averaged set of samples may be filtered by the second sample correct circuit 68, and may be provided to the phase detect/change circuit 70 and the mux/enable generator 72.

The phase detect/change circuit 70 may be configured to detect the phase difference between the BClk and CClk, and may generate the PhA and PhB signals to indicate which CClk clock cycles are phase A and phase B of the BClk clock. The phase detect/change circuit 70 may also detect when phase A and phase B are to be reassigned (because the BClk clock has drifted far enough to change which CClk clock cycles should be phase A and phase B). That is, the BClk rising edge may have drifted to where the majority of the high portion of the BClk is in the phase B CClk clock cycle, rather than in phase A. In one embodiment, the phase change is nominally detected if the rising edge of the BClk is detected at the 180 degree sample point. If the BClk rising edge is detected at the 180 degree sample point of phase A (or beyond, e.g. the 225, 270, or 315 degree sample points), the phase assignments are to be changed. Similarly, if the BClk rising edge is detected at the 180 degree sample point of phase B (or before, e.g. the 0, 45, 90, or 135 degree sample points), the phase assignments are to be changed.

If the phase assignments are to be changed, the phase detect/change circuit 70 may communicate the change to the phase change request circuit 74. The phase change request circuit 74 may signal the arbiter 20, by asserting the Quiet_Req signal, that a quiet period on the bus is needed to change the phases in the synchronizer circuit 30. The arbiter 20 may cease granting the bus to requestors, and may respond when the bus has quieted by asserting the Quiet_Resp signal. The amount of clock cycles between the request for quiet and the response may vary (e.g. tens of clock cycles, such as 20 or 30). During the time until the quiet response is received, the control circuit 32 may continue operating with the current phase assignments. Once the quiet response is received, the phase assignments may be changed.

The mux/enable generator 72 generates the clock enables and the mux selects, responsive to the received samples and PhA, PhB signals from the phase detect/change circuit 70.

In one embodiment, a hysteresis may be implemented to prevent frequent phase changes when the BClk rising edge is close to the phase change edge (180 degrees of either phase). In one embodiment, one additional sample of hysteresis may be provided. That is, a phase change is not requested until the BClk rising edge is detected at the 225 degree sample point in phase A (or beyond 225 degrees) and a phase change is not requested until the BClk rising edge is detected at the 135 degree sample point (or before 125 degrees) in phase B.

Figure 5:
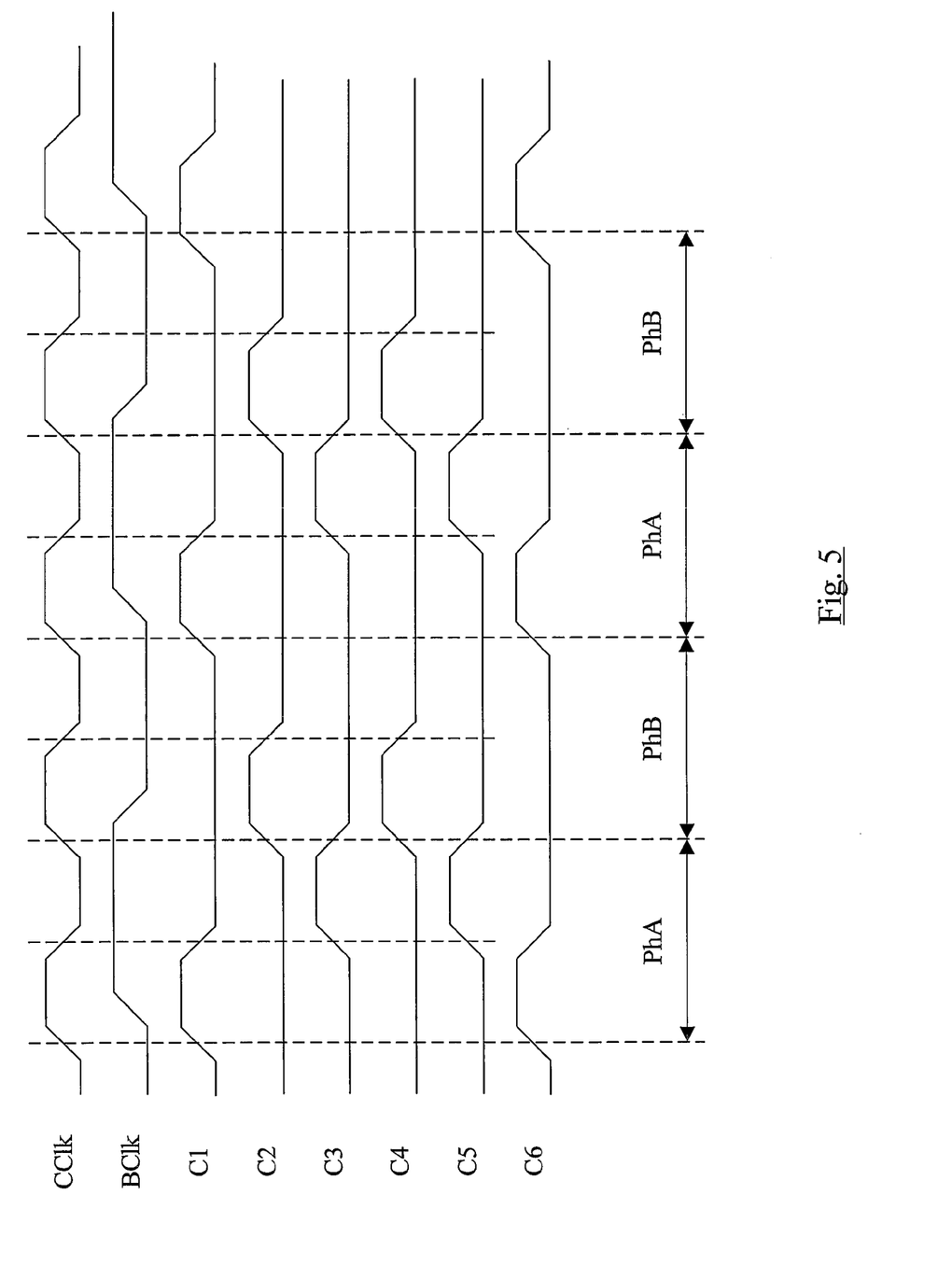
FIG. 5 is a timing diagram illustrating one example of various signals shown in FIG. 2.

Turning next to FIG. 5, a timing diagram is shown illustrating one example of timing relationships between the CClk and BClk, and the clocks C1-C6. The current PhA and PhB assignments are shown at the bottom of FIG. 5. The CClk is shown, and the BClk is shown as well. Additionally, the clocks C1 to C6 are shown.

In the illustrated embodiment, the data is captured in the BClk domain on the rising edge of BClk. Thus, the data is to be available at the input of the flop 42 for setup and hold times based on the rising edge of BClk. The C1 clock is enabled in PhA, The C2 clock is enabled in PhB, and the clock C3 is enabled in PhA. The clocks C2 and C3, as enabled in FIG. 6, may provide long setup and hold times to the next BClk rising edge (e.g. in the second PhA shown in FIG. 5). The latch 36B, clocked by the C3 clock, may be the selected path, e.g., if the rising edge is late in PhB or early in PhA. The latch 36A, clocked by the C2 clock, may be the selected path if the rising edge is mid to late PhA.

The data is also available at the output of the flop 46 according to the rising edge of the BClk clock. Accordingly, the clock C4 is enabled in PhB and the clock C5 is enabled in PhA, providing long setup and hold times to the latches 50A-50B. The clock C6, like the clock C1, is enabled in PhA. The latch 50B, clocked by the C5 clock, may be the selected path if the rising edge is late in PhB or early in PhA. The latch 50A, clocked by the C4 clock, may be the selected path if the rising edge is mid to late PhA. Additionally, in mid to late PhA, the bypass path may be selected instead of path through the latch 50A.

Figure 6:
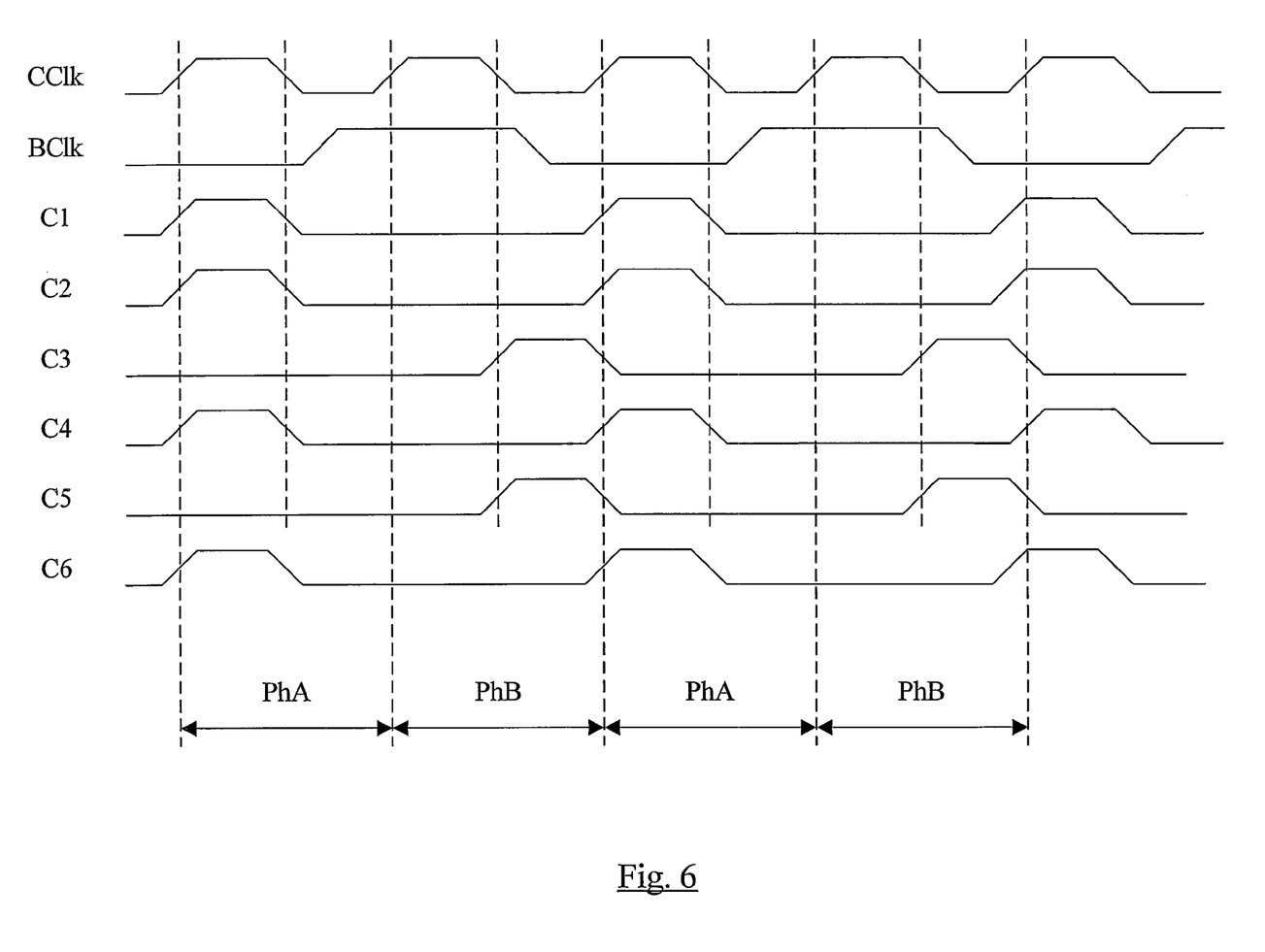
FIG. 6 is a timing diagram illustrating another example of various signals shown in FIG. 2.

FIG. 5 illustrates timings for the BClk rising edge occurring early in PhA. Similar timings may be used if the BClk rising edge occurs late in PhB. On the other hand, if the BClk rising edge occurs late in PhA or early in PhB, a phase change may be detected. While the phase change request is pending but not yet effected, timings shown in FIG. 6 may be used. In FIG. 6, the BClk rising edge occurs late in PhA of the CClk. The C1 and C6 clocks are again generated in PhA. The C2 and C4 clocks are enabled in PhA, and the C3 and C5 clocks are enabled in PhB. The latches 36A and 50B, clocked by the clocks C2 and C4 respectively, may be the path selected if the BClk rising edge is mid to late PhB, and the latches 36B and 50A, clocked by the clocks C3 and C5, respectively, may be selected if the BClk rising edge is detected late in PhA or early in PhB.

Figure 7:
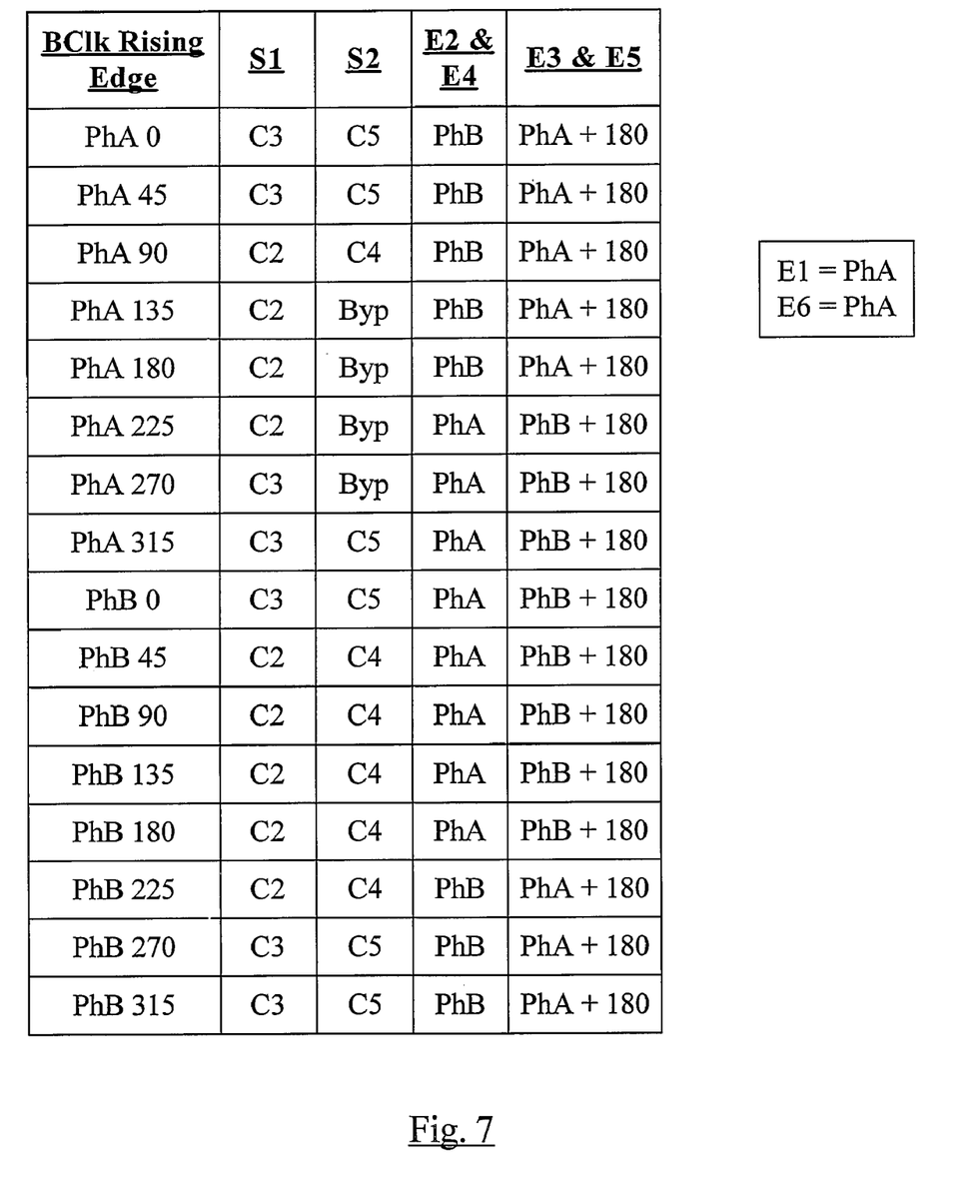
FIG. 7 is a truth table for one embodiment of mux select and enable generation.

FIG. 7 is a truth table illustrating one embodiment of the detection of the BClk rising edge within the samples for PhA or PhB, and the corresponding select and clock enables generated by the mux/enable generator 72 for one embodiment. Other embodiments may vary, especially at the points where enable generation/selection switches in the truth table.

The "BClk Rising Edge" column of the table illustrates the phase (PhA or PhB) of the CClk, and the sample within that CClk, at which the rising edge of BClk is detected. The S1 and S2 columns illustrate the path selected (the path controlled by C2 or C3, for S1, or the path controlled by C4 or C5, for S2) for that detected rising edge. The "E2&E4" column indicates the phase (PhA or PhB) in which the E2 and E4 clock enables are asserted for that detected rising edge. Similarly, the "E3&E5" column indicates the phase (PhA or PhB) in which the E3 and E5 enables are asserted. Since the C3 and C5 clocks are approximately 180 degrees out of phase with the CClk, the E3 and E5 enables may be asserted 180 degrees into the corresponding phase, as shown in FIG. 7 (or slightly less than 180 degrees into the corresponding phase, according to the timing requirements of the clock gater). The E1 and E6 enables may be asserted during PhA in each case, as shown to the right of the table in FIG. 7.

Figure 8:
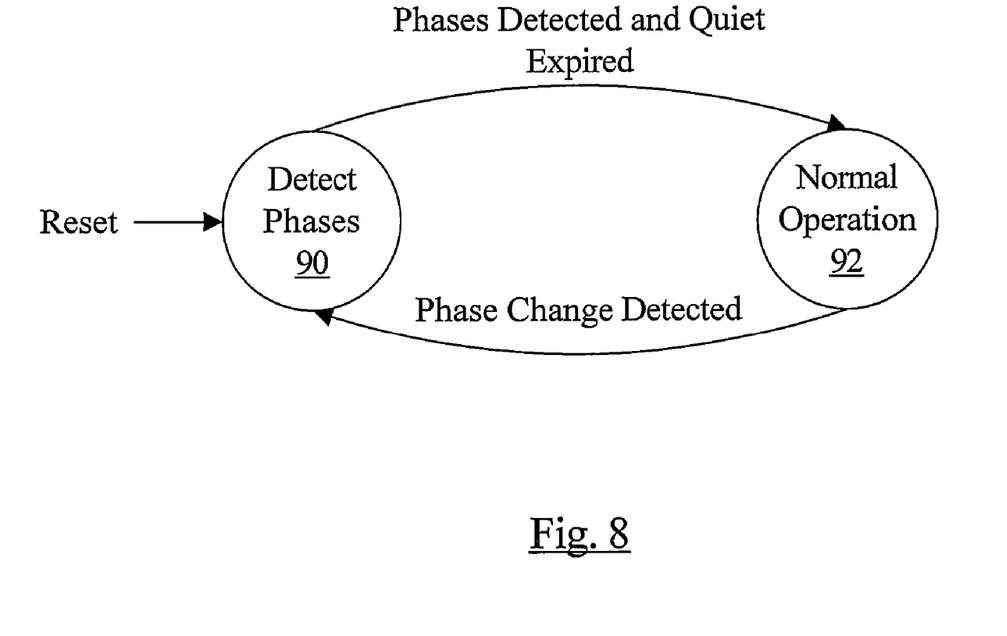
FIG. 8 is a state machine diagram illustrating one embodiment of changing from one phase detection to another.

FIG. 8 is a state machine diagram illustrating operation of one embodiment of the phase detect/change circuit 70. In the "detect phases" state 90, the phase detect/change circuit 70 may be evaluating samples to assign PhA and PhB to the CClk. This phase detect/change circuit 70 may enter this state in response to reset, or in response to detect that a phase change is needed. The phase detect/change circuit 70 may remain in the detect phases state 90, asserting the quiet request to the arbiter 20 and awaiting the quiet response from the arbiter 20. The phase detect/change circuit 70 may exit the state 90 to a normal operation state 92 (in which the PhA and PhB signals are generated for the mux/enable generator 72) once the phases have been detected and the quiet period has expired, permitting the PhA and PhB relationships to be effected. The state machine may remain in the normal operation state 92 until another phase change is detected.

Figure 9:
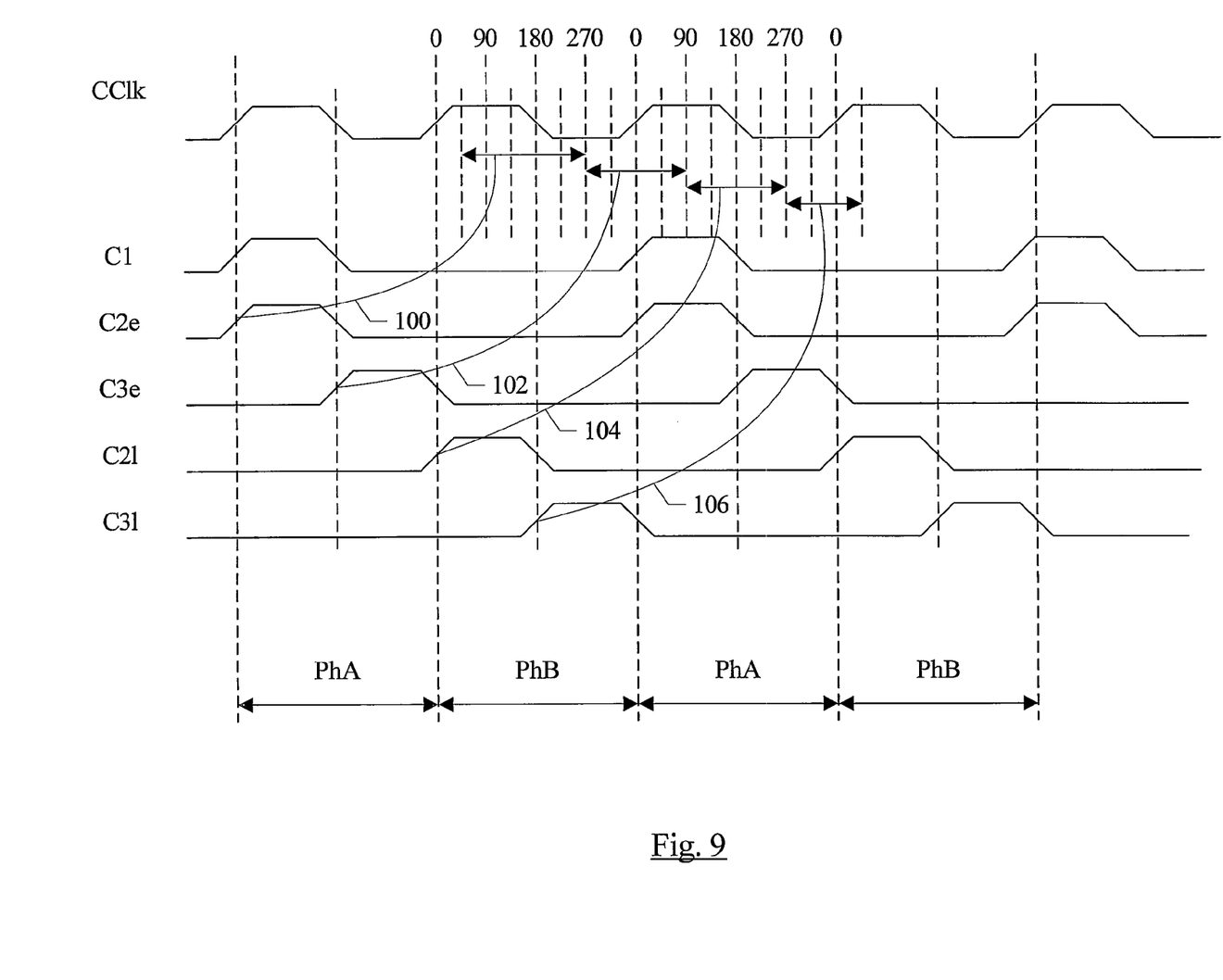
FIG. 9 is a timing diagram illustrating transmission of data according to various clock signals.

FIG. 9 is a timing diagram illustrating the CClk, the C1 clock, and the two possible enables of the C2 and C3 clocks. The enable of the C2 and C3 clocks in PhA are labeled C2e and C3e (C2 early and C3 early). The enable of the C2 and C3 clocks in PhB are labeled C2l and C3l (C2 late and C3 late). Additionally shown in FIG. 9 are the sample points of the BClk, in both PhB and PhA, illustrated as vertical dotted lines. Each other sample point is labeled at the top of FIG. 9 (0 degrees, 90 degrees, etc.).

For each enabled clock C2e, C3e, C2l, and C3l, a horizontal arrow is shown across the vertical dashed lines illustrating the sample points at which, if the BClk rising edge is detected for those sample points, the path controlled by the corresponding clock is selected to transmit the data to the BClk flop. Lines 100, 102, 104, and 106 link the enabled clock C2e, C3e, C2l, and C3l (respectively) to the corresponding range of sample points. As FIG. 9 illustrates, a low latency synchronous transfer of data may be effected in each possible case.

Numerous variations and modifications will become apparent to those skilled in the art once the above disclosure is fully appreciated. It is intended that the following claims be interpreted to embrace all such variations and modifications.

What is claimed is:

1. An apparatus to synchronously communicate on an interface that has an associated interface clock, the apparatus for a circuit that has an internal clock used internal to the circuit, the apparatus comprising:
   a first latch coupled to receive data;
   a second latch coupled in parallel with the first latch to receive the data;
   a first clock gater coupled to receive the internal clock and a first clock enable, wherein the first clock gater is coupled to the first latch to provide a clock to the first latch;
   a second clock gater coupled to receive an inversion of the internal clock and a second clock enable, wherein the second clock gater is coupled to the second latch to provide a clock to the second latch; and a control circuit coupled to receive the internal clock and the interface clock, wherein the control circuit is configured to capture a plurality of samples of the interface clock for each clock cycle of the internal clock, and wherein the control circuit is configured to generate the first clock enable and the second clock enable responsive to the plurality of samples.

2. The apparatus as recited in claim 1 further comprising a mux coupled to an output of the first latch and the second latch, wherein the control circuit is configured to generate a select control for the mux responsive to the plurality of samples.

3. The apparatus as recited in claim 2 wherein the data input to the first latch and to the second latch is also provided as a mux input for a bypass path for the data, wherein the control circuit is configured to select the bypass path for one or more phase differences between the internal clock and the interface clock that are indicatable by the samples.

4. The apparatus as recited in claim 1 wherein the internal clock operates at a first frequency that is a multiple of a second frequency of the interface clock, during use, and wherein a phase difference is between a rising edge of the interface clock and a rising edge of the internal clock that is near the rising edge of the interface clock.

5. The apparatus as recited in claim 4 wherein the control circuit is further configured to detect whether a given clock cycle of the internal clock is primarily in a high portion of the interface clock or a low portion of the interface clock.

6. The apparatus as recited in claim 5 wherein the control circuit is further configured to generate the first clock enable and the second clock enable during the high or low portion of the interface clock dependent on the samples.

7. The apparatus as recited in claim 1 wherein the control circuit comprises:

a delay line coupled to receive the internal clock and to generate a plurality of delayed clocks; and a plurality of flops, each of the plurality of flops clocked by a respective delayed clock of the plurality of delayed clocks, wherein each of the plurality of flops is coupled to receive the interface clock and to sample the interface clock according to the respective delayed clock.

8. The apparatus as recited in claim 7 wherein the plurality of delayed clocks are nominally evenly spaced throughout the clock cycle of the internal clock.

9. The apparatus as recited in claim 8 wherein the plurality of delayed clocks include clocks that cause a sample at nominally 0 degrees, 90 degrees, 180 degrees, and 270 degrees.

10. The apparatus as recited in claim 9 wherein the plurality of delayed clocks further include clocks that cause a sample at nominally 45 degrees, 135 degrees, 225 degrees, and 315 degrees.

11. An apparatus to synchronously communicate on an interface that has an associated interface clock, the apparatus for a circuit that has an internal clock used internal to the circuit, the apparatus comprising:

a control circuit coupled to receive the internal clock and the interface clock, wherein the control circuit is configured to sample the interface clock a plurality of times per clock cycle of the internal clock, and wherein the control circuit is configured to detect a phase difference, to a granularity of the samples, between the internal clock and the interface clock responsive to the samples; and a data path configured to transport data between an internal clock domain and an interface clock domain, the data path configured to provide at least two different timings on the transported data relative to the internal clock, and wherein the control circuit is coupled to the data path and is configured to select one of the timings responsive to a detected phase difference;

wherein the control circuit comprises:

a delay line coupled to receive the internal clock and to generate a plurality of delayed clocks; and a plurality of flops, each of the plurality of flops clocked by a respective delayed clock of the plurality of delayed clocks, wherein each of the plurality of flops is coupled to receive the interface clock and to sample the interface clock according to the respective delayed clock.

12. The apparatus as recited in claim 11 wherein the control circuit is configured to select the timing that provides the best setup and hold time characteristics for the transported data in the receiving one of the internal clock domain and the interface clock domain.

13. The apparatus as recited in claim 11 wherein the internal clock operates at a first frequency that is a multiple of a second frequency at which the interface clock operates during use.

14. The apparatus as recited in claim 11 wherein the plurality of delayed clocks are nominally evenly spaced throughout the clock cycle of the internal clock.

15. A method to synchronously communicate on an interface that has an associated interface clock, for a circuit that has an internal clock used internal to the circuit, the method comprising:

sampling the interface clock a plurality of times per clock cycle of the internal clock;

selecting one of a plurality of timings through a data path that transports data between an internal clock domain and an interface clock domain, the plurality of timings relative to the internal clock, responsive to the samples; and transporting the data with the selected timing to a receiving clock domain of the internal clock domain or the interface clock domain wherein one of the plurality of timings is provided by a first latch controlled responsive to the internal clock and another of the plurality of timings is provided by a second latch controlled responsive to an inversion of the internal clock.

16. The method as recited in claim 15 wherein the selected timing provides the best setup and hold time characteristics for the transported data in the receiving clock domain and the interface clock domain.

17. The method as recited in claim 15 wherein yet another of the plurality of timings is provided by bypassing the first and second latch.

18. The method as recited in claim 15 wherein the samples are nominally evenly spaced throughout the clock cycle of the internal clock.

* * * * *